(12) United States Patent
Chen (10) Patent No.: US 6,279,977 B1
(45) Date of Patent: Aug. 28, 2001

(54) ARMREST MOUNTED COMPUTER DOCK

(76) Inventor: Jack Chen, 14 Kimberly Cir., Oak Brook, IL (US) 60521

( * ) Notice: Subject to any disclaimer, the term of this patent is extended or adjusted under 35 U.S.C. 154(b) by 0 days.

(21) Appl. No.: 09/576,793

(22) Filed: May 23, 2000

(51) Int. Cl.$^7$ .................................................. B60R 11/00
(52) U.S. Cl. ........................................ 296/24.1; 296/37.8
(58) Field of Search ............................. 296/37.8, 37.14, 296/37.15, 24.1; 224/275, 539, 281

(56) References Cited

U.S. PATENT DOCUMENTS

| | | | |
|---|---|---|---|
| 4,417,764 | * | 11/1983 | Marcus et al. ........................ 297/194 |
| 4,668,010 | * | 5/1987 | Fujiwara ............................... 297/150 |
| 4,946,120 | * | 8/1990 | Hatcher ................................. 248/183 |
| 5,372,403 | * | 12/1994 | Puerto ............................. 297/188.17 |
| 5,564,668 | * | 10/1996 | Crowe, II .......................... 248/284.1 |
| 5,775,762 | * | 7/1998 | Vitito ................................... 296/37.8 |
| 5,951,128 | * | 9/1999 | Aidino et al. ...................... 312/235.8 |
| 5,996,866 | * | 12/1999 | Sucko et al. ........................... 224/281 |
| 6,020,654 | * | 2/2000 | Chutorash ............................ 307/10.1 |

FOREIGN PATENT DOCUMENTS

406099777 A * 4/1994 (JP) ....................................... 224/281

* cited by examiner

*Primary Examiner*—D. Glenn Dayoan
*Assistant Examiner*—Lori L. Coletta
(74) *Attorney, Agent, or Firm*—Robert L. Marsh (57) ABSTRACT

A computer dock is mounted within the armrest of an automobile between the driver and passenger seat thereof. The armrest includes an enclosure having a forward opening, a rearward opening, and a passage therethrough. A tray for retaining a computer is mounted on a slide structure slideably moveable to any of three positions. In the first position, the tray is positioned forward of the forward opening. In the second position, the tray is positioned rearward of the rearward opening. In the third position, the tray is positioned within the enclosure of the armrest. The computer dock is built into the tray and includes all the functions needed to support the computer and has attachments for attaching the computer thereto.

15 Claims, 11 Drawing Sheets

ARMREST MOUNTED COMPUTER DOCK

The present invention relates to a mounting for retaining a computer within a vehicle, and for providing support functions to the computer, commonly referred to as a computer dock. In particular, the present invention relates to a mounting or computer dock which, when not in use, stores the computer in the armrest of a vehicle.

BACKGROUND OF THE INVENTION

Technological advances in the semiconductor industry have resulted in very powerful computers being available in small sizes. The notebook computer can contain the computing capabilities of a larger PC, but the small size of such devices has limitations. One obvious limitation is battery power. A battery operated computer is useable for only a short time without recharging or replacing batteries. Small computers also require support facilities if they are to read CD ROMs, receive e-mail or interact with global positioning systems with the capabilities of a typical desk mounted computer.

My prior patent application Ser. No. 09/425,924 filed Oct. 25, 1999, disclosed an automobile mounted computer dock for providing support to a notebook computer. With the aid of the dock of my prior application, a notebook computer can perform all the functions which can be performed by on a home mounted PC's. The devise, as disclosed, however, was intended for use in the dashboard of a vehicle. The mounting of a computer to the dashboard, however, renders it unusable to passengers in the rear seat. Since a driver must direct his full attention to operating a moving vehicle, it would be desirable to have a dock which would render the computer usable by the passengers in the vehicle, including those in the rear seat.

SUMMARY OF THE INVENTION

Briefly, the present invention is embodied in a mounting for retaining a computer for use in the armrest of an automobile. The mounting, or dock, of the present invention has an enclosure defined by the outer surface of the armrest, the enclosure having a forward opening and a rearward opening and a passage extending through the enclosure connecting the two openings. A tray is mounted on a slide assembly for movement between three positions. In the first position the tray is forward of the forward opening, in the second position the tray is rearward of the rearward opening, and the third position the tray is within the enclosure. The tray has mounting devices, such as holes or clamps for retaining the notebook computer. Within the tray are electronic support functions for use with the computer and cables are provided to attach the functions available in the tray, or dock, to the computer.

BRIEF DESCRIPTION OF THE DRAWINGS

A better and more complete understanding of the present invention will be had after a reading of the following detailed description taken in conjunction with the following drawings, wherein.

DETAILED DESCRIPTION OF THE PREFERRED EMBODIMENT

Figure 1:
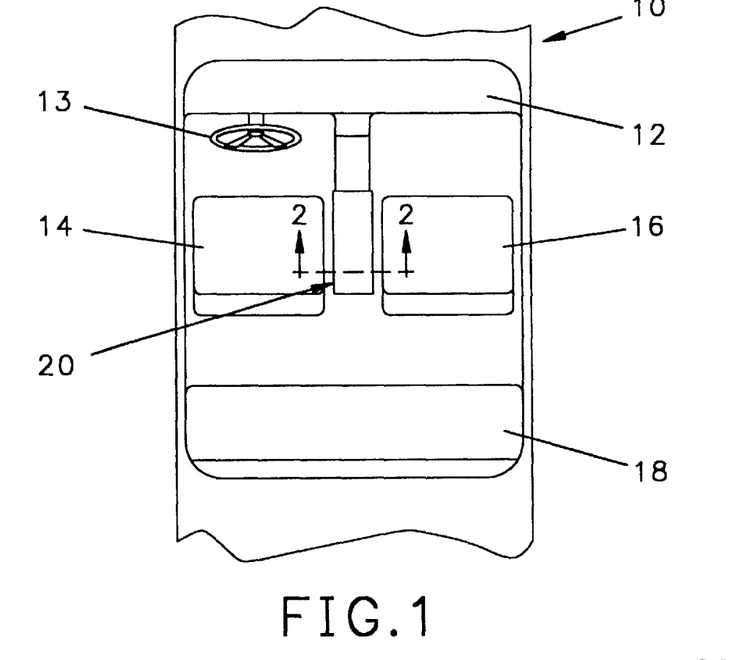
FIG. 1 is a schematic view of the layout of seating within a typical automobile having a console between the front seats thereof and an elevated armrest incorporating the present invention.

Referring to FIG. 1, the interior of an automobile 10 includes a dashboard 12 having a steering wheel 13 behind which is the driver's seat 14. Opposite the driver's seat 14 is a front passenger seat 16, and behind the two front seats 14, 16 is a rear seat 18. Between the front seats 14,16, and visible to passengers in the rear seat 18, is a console or armrest 20.

Figure 2:
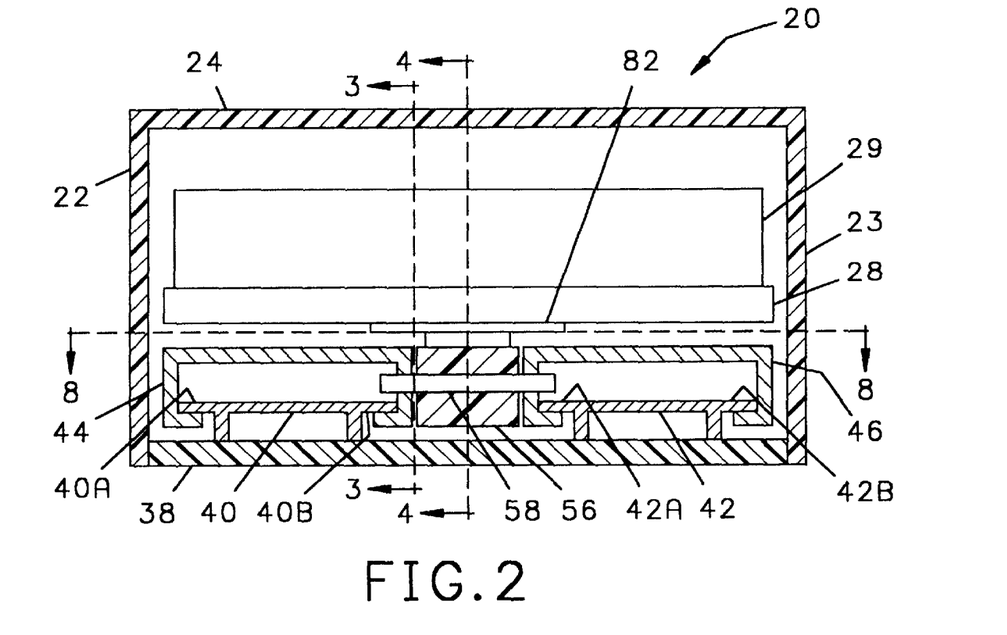
FIG. 2 is an enlarged cross sectional view of the armrest shown in FIG. 1 taken through lines 2—2 of FIG. 1.
Figure 3:
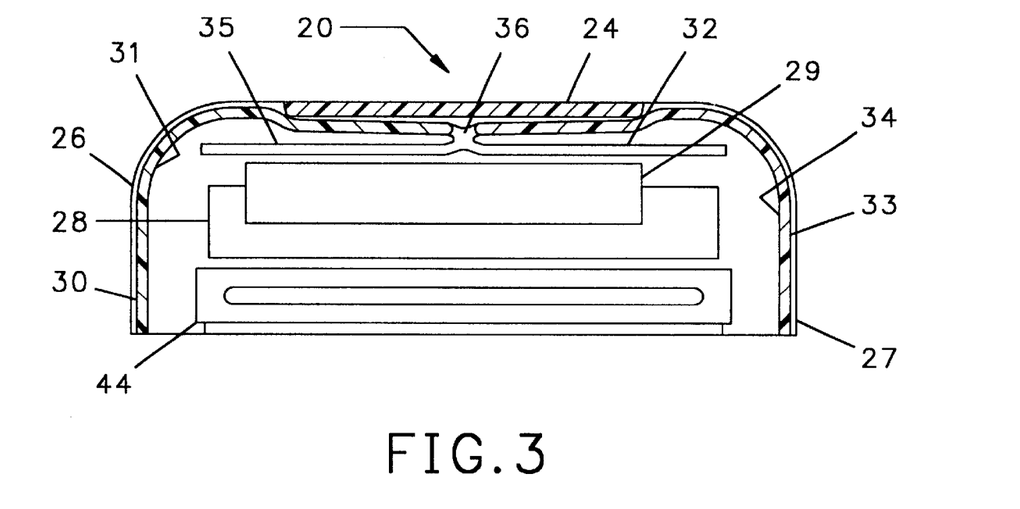
FIG. 3 is a cross sectional view of the armrest shown in FIG. 2 taken through lines 3—3 of FIG. 2.
Figure 4:
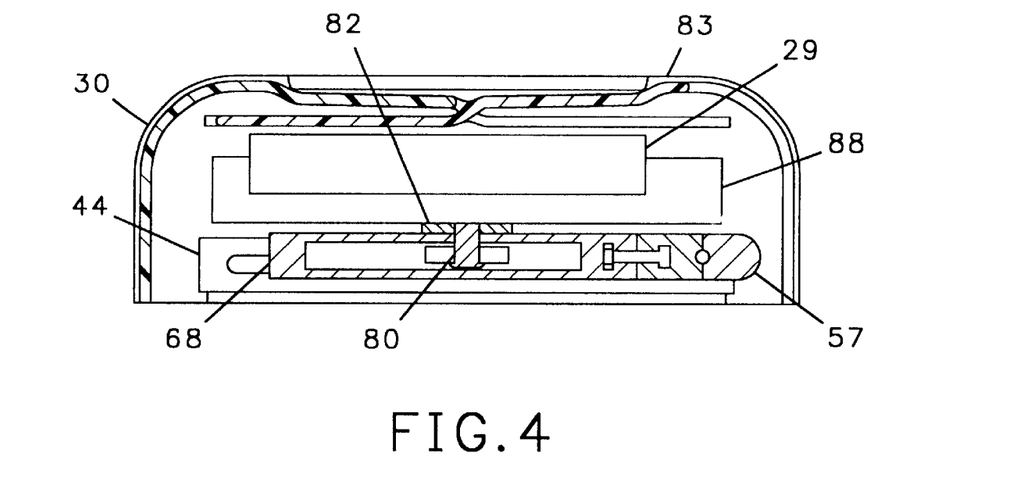
FIG. 4 is another cross sectional view of the armrest shown in FIG. 2 taken through line 4—4 thereof.

Referring to FIGS. 2–4, the armrest 20 has opposing parallel sides 22, 23 and an upper surface 24 having sufficient rigidity to withstand impacts from passengers of the vehicle, and having an exterior which presents an esthetically attractive appearance. Within the enclosure defined by the sides 22, 23 and the upper surface 24 is a passage accessible from either a forward opening 26 or a rearward opening 27 and moveable therethrough is a tray 28 to which a computer 29 is attached as is further described below. The tray 28 includes connectors for connecting the computer 29 to circuits, as is also described below, which supplement the computer 29. The tray 28, therefor, is a computer dock, and is hereafter interchangeably referred to as either a "tray" or a "computer dock".

Referring to FIGS. 3 and 4, the forward opening 26 of the enclosure is closed by a door 30 made of a plurality of hinged panels so as to be moveable along a curved track 31 having an elongate end 32 into which the door is slideable when the door 30 is opened. Similarly, the rearward opening 27 of the enclosure is closed by a door 33 made of a plurality of hinged panels so as to be moveable along a second curved track 34 having an elongated end 35 into which the door 33 is slideable when the door 33 is opened. As can be seen, the tracks for the forward and rearward door 30, 33 cross each other at an intersection 36, such that when one door 30, 33 is opened (door 33 is depicted as being opened in FIG. 3), the opened door 33 will extend through the intersection 36 and prevent the other door 30 from being opened.

Referring to FIGS. 2, 5–8, positioned longitudinally along the bottom surface 38 of the armrest 20 is a pair of parallel guides 40, 42 each of which has horizontally extending flanges 40A, 40B and 42A, 42B the longitudinal edges of which are all parallel. Fitted around each of the guides 40, 42 is a pair of slides 44, 46 having a generally rectangular cross section.

Figure 5:
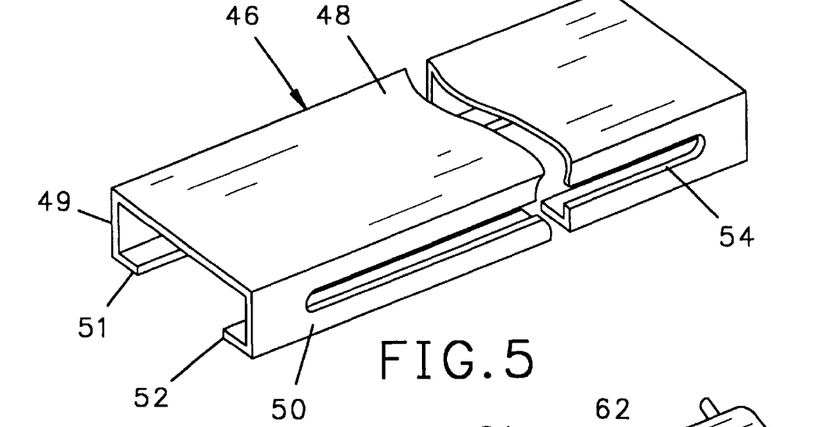
FIG. 5 is an isometric view of a slide from within the armrest shown in FIG. 2.
Figure 8:
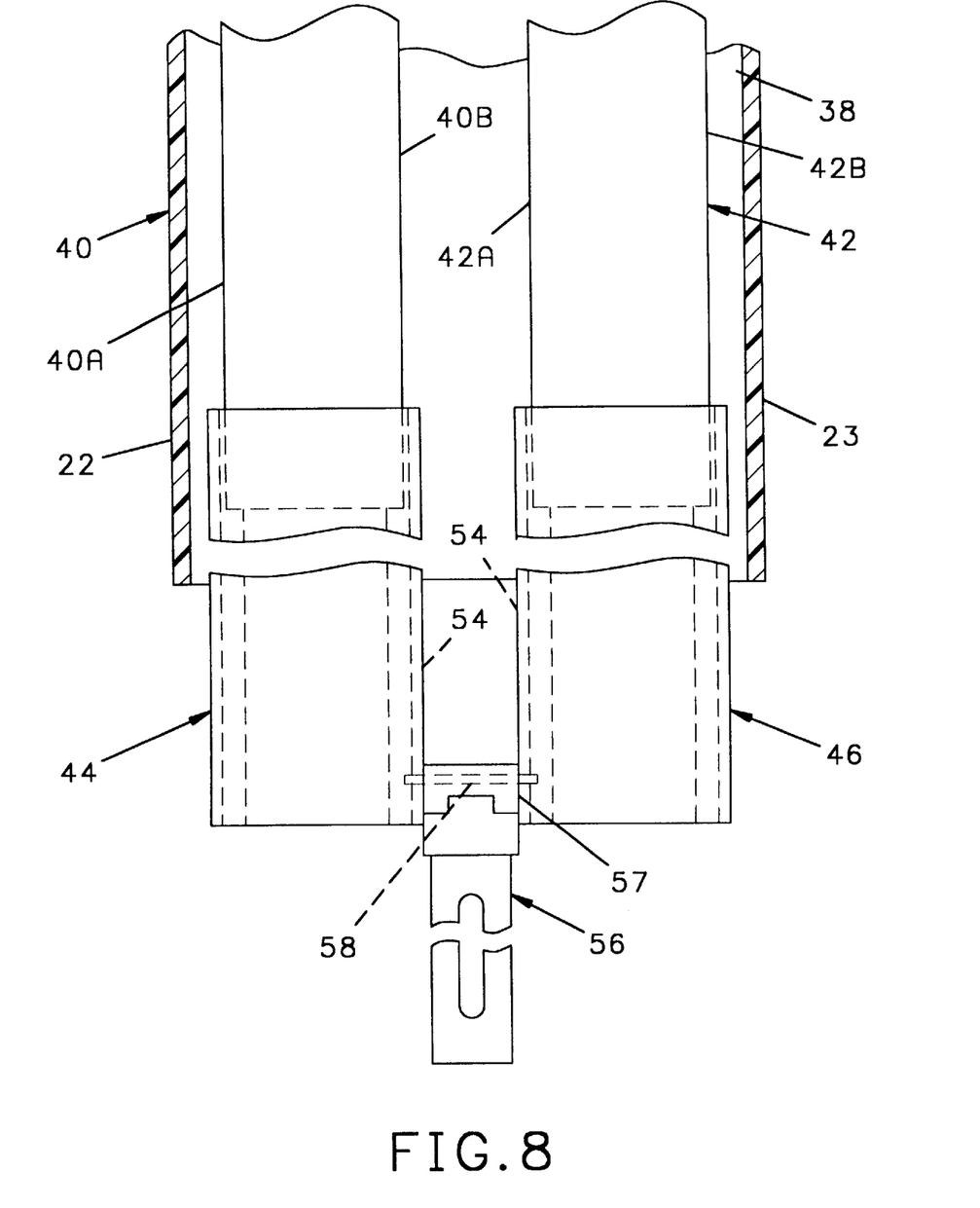
FIG. 8 is a fragmentary cross sectional view taken through line 8—8 of FIG. 2 with the slide assembly moved partially out of the enclosure.

As best shown in FIG. 5, each slide 44, 46 of which number 46 is representative or both, has a planar upper surface 48, parallel opposing sides 49, 50 and extending towards each other from the lower edges of each of the sides 49, 50 are inwardly extending flanges 51, 52 respectively. As best shown in FIGS. 2 and 8, the inwardly extending flanges 51, 52 of each of the slides 44, 46 extend around the flanges 40A, 40B and 42A, 42B respectively such that the slides 44, 46 are longitudinally moveable along their associated guide 40, 42.

Referring to FIGS. 2 and 8, one side 50 of each of the slides 44, 46 has an elongate slot 54, and the slots 54 are oriented adjacent to each other and spaced apart a distance to allow a center slide member 56 to move between them. The center slide member 56 has a pin 58 extending transversely through an end piece 57 thereof and the opposing ends of the pin 58 extend into the slots 54 of the slides 44, 46.

Figure 6:
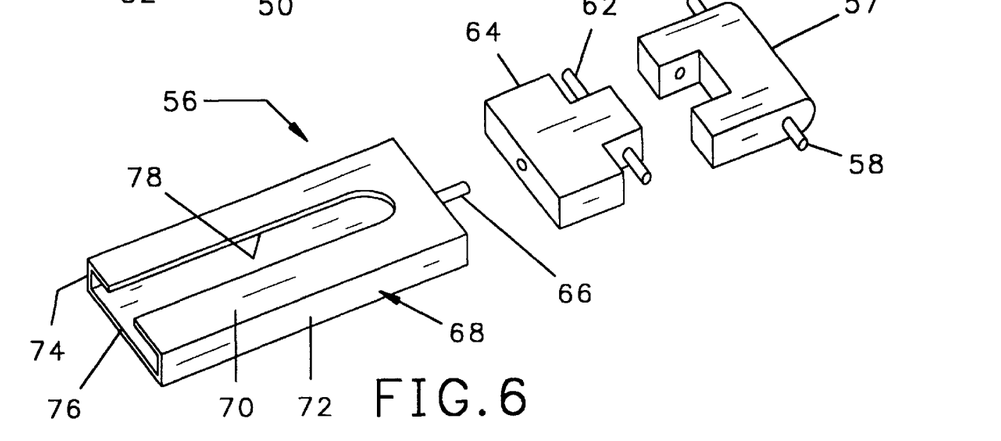
FIG. 6 is an enlarged exploded view of a center slide member used in the assembly within the armrest shown in FIG. 2.
Figure 7:
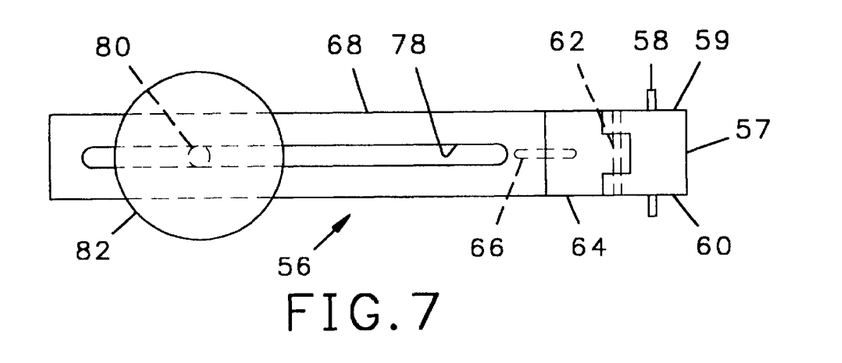
FIG. 7 is a top view of the center slide member shown in FIG. 6.

Referring to FIGS. 6, 7, and 8, the end piece 57 of the center slide member 56 has parallel sides 59, 60 which fit snuggly between the parallel sides 50 of the slides 44, 46 so as to be longitudinally slideable with respect to the slides 44, 46 while being retained between the slides 44, 46 by the pin 58.

Pivotally attached to the end piece 57 by a second horizontal pin 62 is a vertically moveable pivot member 64, and axially rotatable about a longitudinal pin 66 extending into the pivot member 64 is a mounting arm 68. The mounting arm 68 is preferably made of sheet metal shaped into a rectangular cross section with a planar top 70 parallel sides 72, 74 and a bottom 76. Extending longitudinally through the planar top 70 is an elongate slot 78. Referring to FIGS. 4 and 7, mounted on a fourth pin 80 which extends through the slot 78 is a turntable 82, and mounted to the turntable 82 is the computer dock 28.

As can be seen, the slides 44, 46 are longitudinally moveable with respect to the guides 40, 42 and can be extended outward through either the forward opening 26 or the rearward opening 27 of the armrest 20. The computer dock 28 is mounted on the center slide member 56, and the center slide member 56 is longitudinally moveable with respect to the slides 44, 46. The longitudinal movement of the center slide member 56 is limited by the pin 58 contacting the ends of the slots 54 in the slides 44, 45. The computer dock 28 is also longitudinally moveable with respect to the center slide member 56 by movement of the pin 80 within the slot 78 in the mounting arm 68. These three portions, the slides 44,46, the center slide member 56, and the pin 80 allow extended linear movement of the dock 28, as is further described below.

The dock 28 may also be tilted by rotation of the pivot member 64 about the pin 62. As can be seen, the axis of the pin 62 is perpendicular to the direction of the linear movement of the dock described above. The dock 28 is also rotatable about the longitudinal pin 66, which is perpendicular to the pivot pin 62 and lies with a plane containing the line of movement of the longitudinally moveable parts. Finally, the dock 28 is also rotatable on the turntable 82 and the pin 80 with respect to the mounting arm 68.

Figure 9:
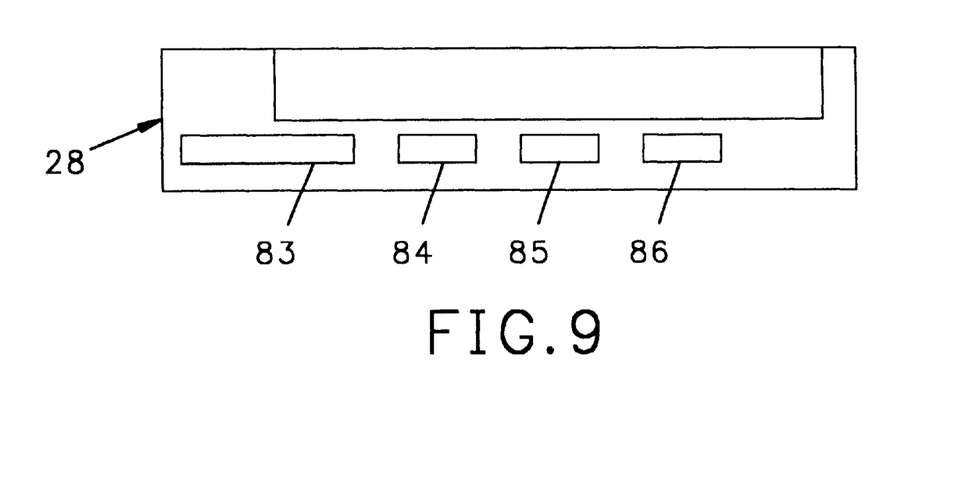
FIG. 9 is a further enlarged top view of the computer dock for use in the armrest shown in FIG. 2.
Figure 10:
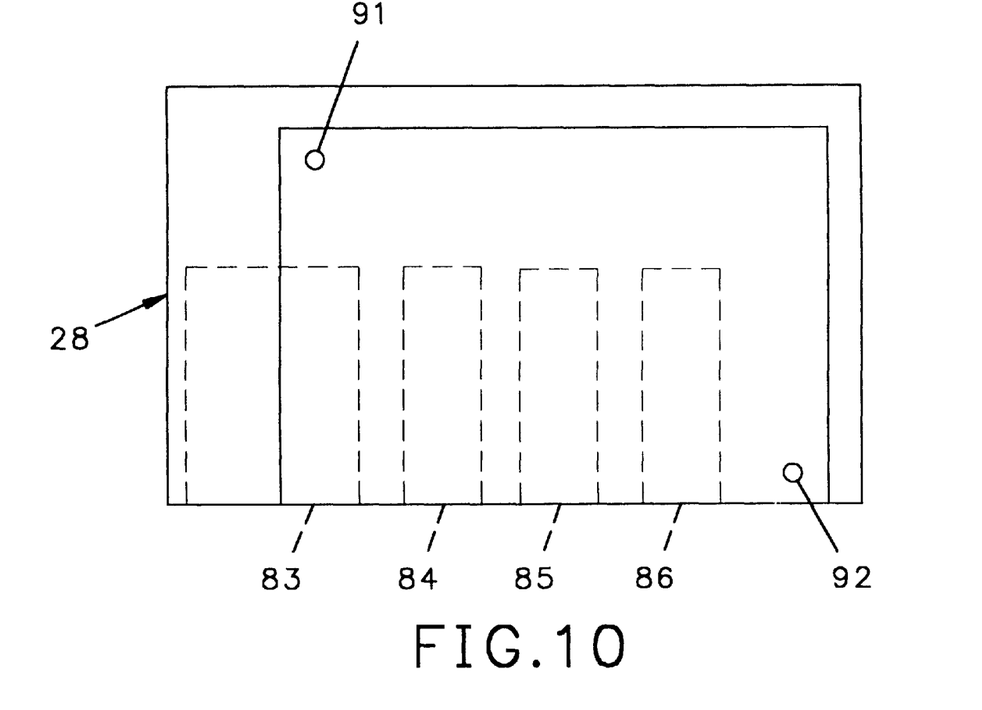
FIG. 10 is a side elevational view of the dock shown in FIG. 9.
Figure 11:
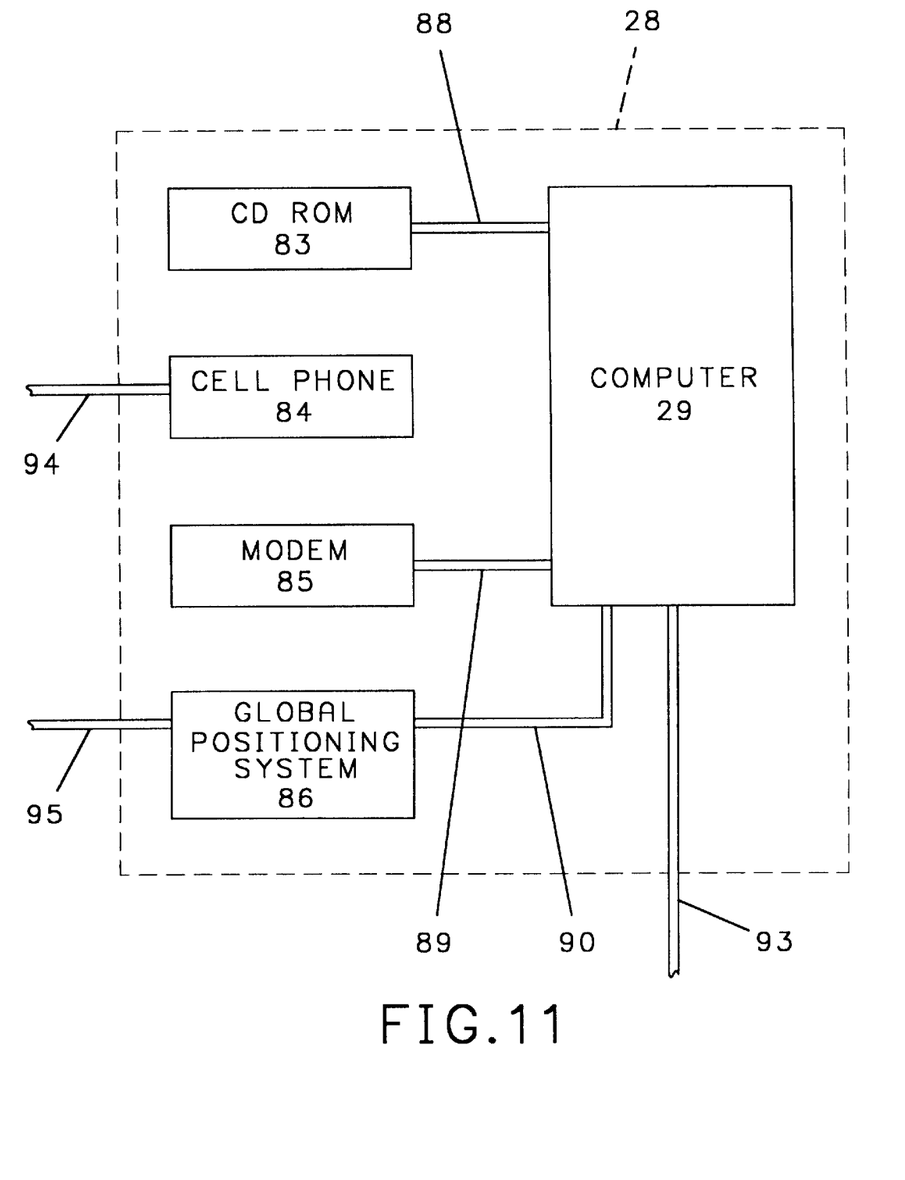
FIG. 11 is a schematic view of the wiring of the computer dock shown in FIG. 9.

Referring to FIGS. 9, 10, and 11, the dock 28 includes computer supports functions, specifically a CD ROM 83, a cell phone 84, a modem 85, and a global positioning system 86. Connector cables 88, 89, 90 extend from the CD ROM 83, the modem 85 and the global positioning system 86, respectively, for attachment to jacks on the notebook computer 29. The computer 29 is removeably retained to the dock 28 by any suitable means, such as screws, not shown, extending through mounting holes 91, 92. The dock 28 also has a cable 93 for providing power from the battery and power system of the vehicle, not shown, to the notebook computer 28 and cables 94, 95 for attaching the cell phone 84 and the global positioning system 86, respectively, to a suitable antenna. With the support functions provided by the computer docks a notebook computer 29 attached thereto has all the capabilities of a conventional PC.

Figure 12:
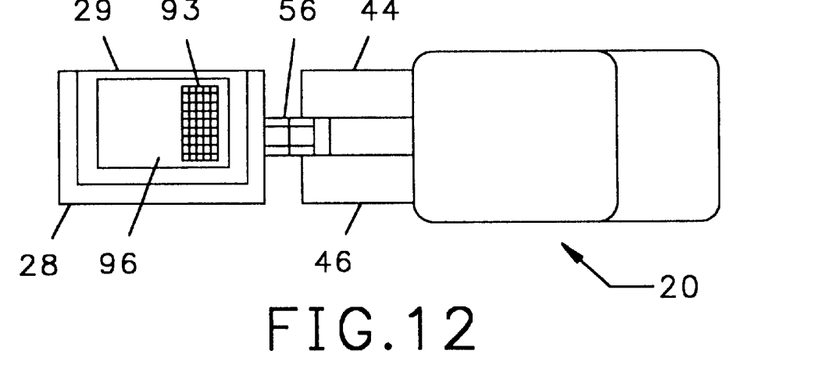
FIG. 12 is a top elevational view of the armrest shown in FIG. 2 with the computer dock extending from the forward end thereof.
Figure 13:
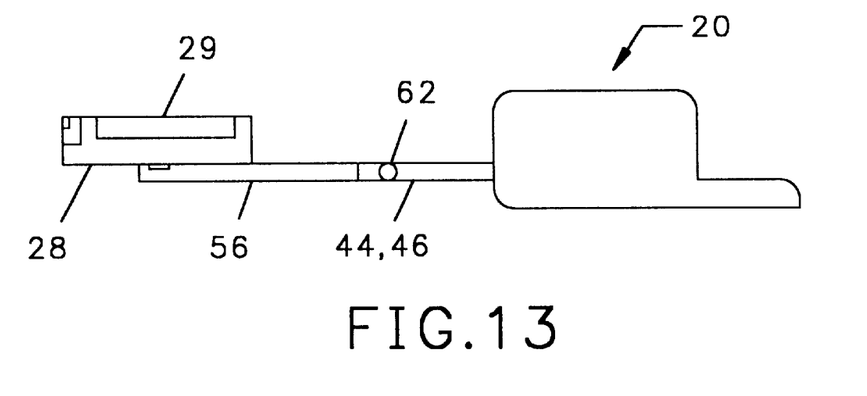
FIG. 13 is a side elevational view of the armrest, dock and computer as shown in FIG. 12 with portions of the interior of the armrest shown in broken lines.
Figure 14:
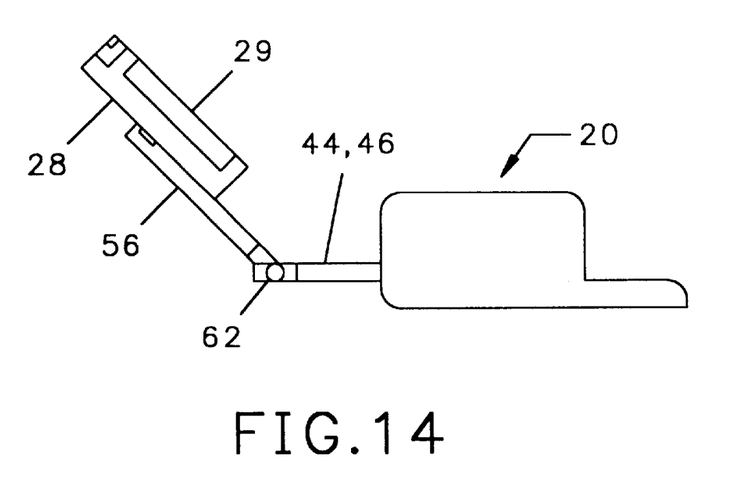
FIG. 14 is a side elevational view of the armrest, dock, and computer shown in FIG. 2 with the dock tilted to facilitate use by passengers of the front seat.
Figure 15:
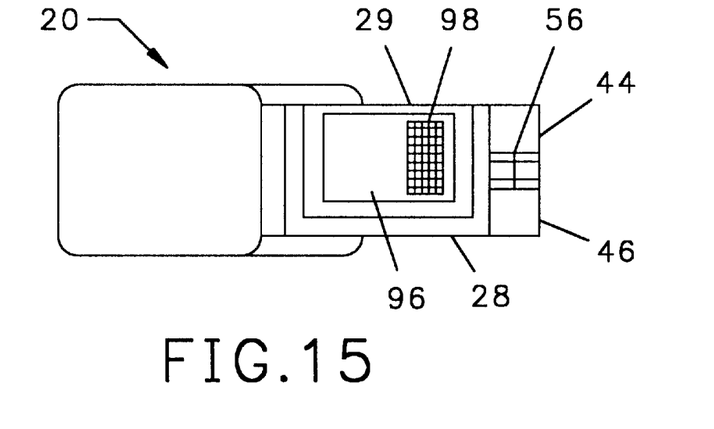
FIG. 15 is a top elevational view of the armrest shown in FIG. 2 with the dock and computer moved to the rearward position.
Figure 16:
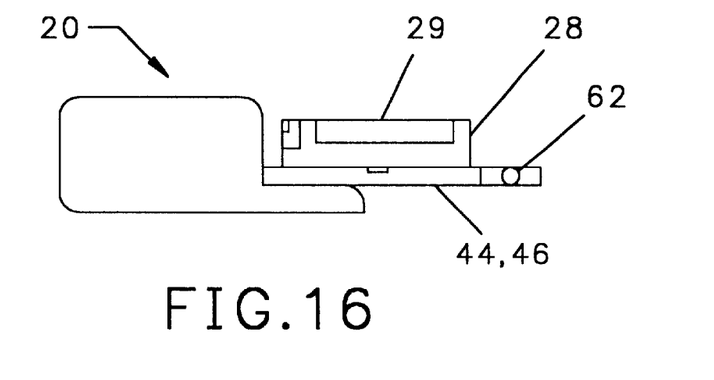
FIG. 16 is a side elevational view of the armrest, dock, and computer as shown in FIG. 15.
Figure 17:
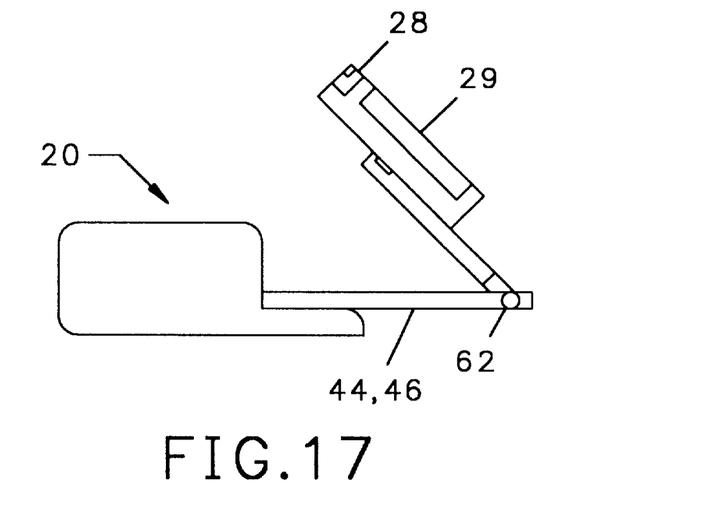
FIG. 17 is a side elevational view of the armrest, dock, and computer as shown in FIG. 16 with the dock angled to render the computer more visible to passengers in the rear seat.
Figure 18:
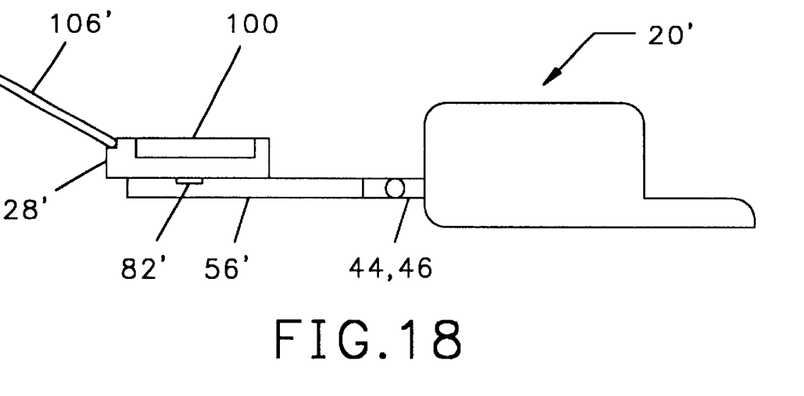
FIG. 18 is a side elevational view of a second embodiment of the present invention with the dock and computer extended forward of the armrest.
Figure 19:
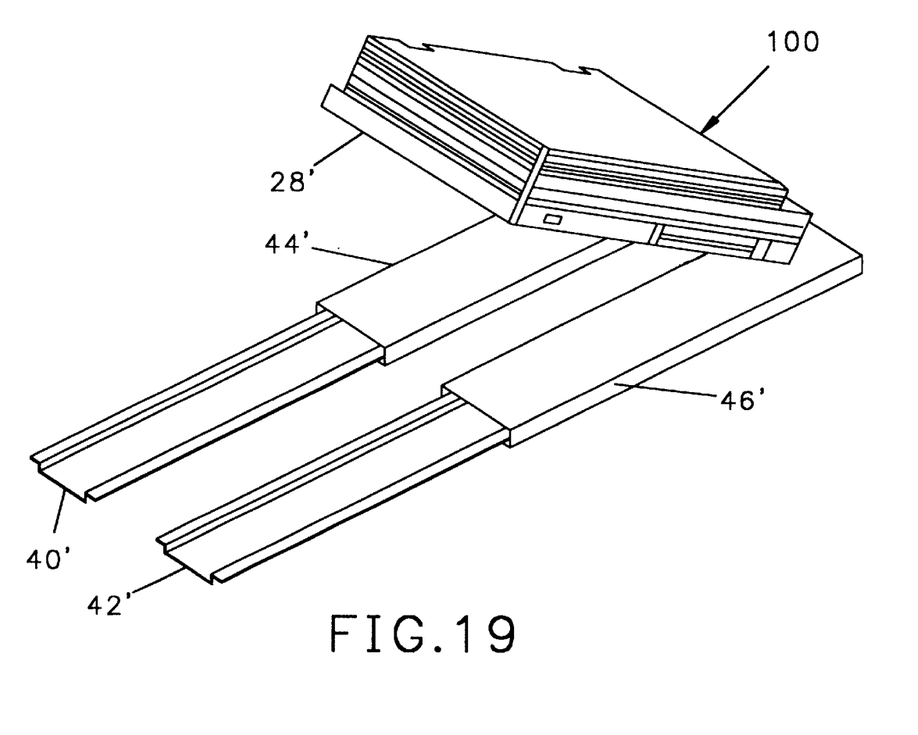
FIG. 19 is a isometric view of the guides, the slides, the dock and the computer of the embodiment shown in FIG. 18.
Figure 20:
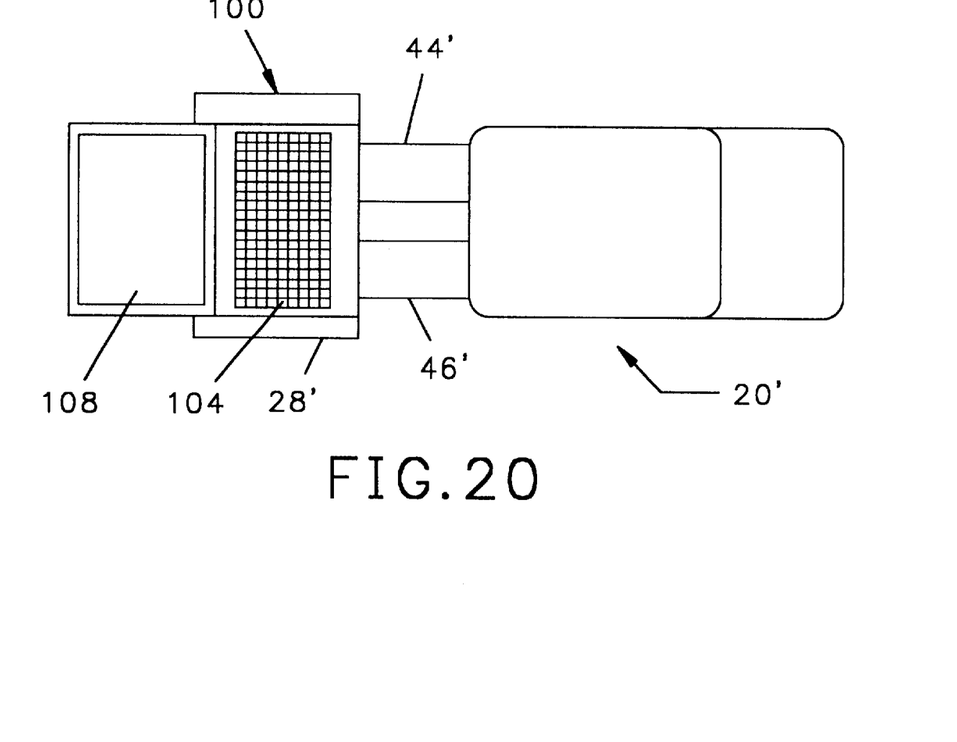
FIG. 20 is a top elevational view of the armrest, dock, and computer shown in FIG. 18.

Referring to FIGS. 12–17, when the computer 29 is attached to the dock 28, the computer is moveable longitudinally as the slides 44, 46 move with respect to the guides 40, 42 and the center slide member 56 moves with respect to the slides 44, 46. The computer 29 and dock 28 are moved forward through the forward opening 26 as shown in FIGS. 12 and 13 where it is visible to the passengers in the front seats of the vehicle 10. It may also be moved through the rear open 27 to the position shown in FIGS. 15 and 16 where it is visible by passengers in the rear seat 18. When not in use, the computer 28 and dock 29 can be stored within the armrest 20 with the doors 30, 33 closed.

In the embodiment depicted in FIGS. 12–17, the notebook computer 29 is provided with a double hinge assembly of the type disclosed in my previously filed patent application Ser. No. 09/538,256, filed Mar. 30, 2000. In that application I disclosed a housing for a notebook computer having a computer housing with a screen pivotally mounted such that it can be folded with the back of the screen against the computer housing and the screen 96 visible. When used in this embodiment, software must be employed which the computer 29 which configures a portion of the screen 96 is allocated to project a keyboard 98 such that information may be inserted in the computer 29 by touch on the virtual keyboard 98. In this embodiment, only a portion of the screen 96 is allocated to project keyboard 98, leaving the remaining portions thereof as reduced screen for a computer output.

Referring to FIGS. 18–23 in which the armrest mounted computer dock 20' is employed with a computer housing in which the viewing screen is retained to the body of the computer by a conventional hinge. In this embodiment, elements which are substantially like elements of the first embodiment bear like indicia numbers except they are primed.

Like the first embodiment, the armrest 20' has parallel opposing walls and an upper surface which define a passage having slides 44', 46', moveable guides 40', 42' a moveable center slide 56' and a pivoting computer dock 28' as previously disclosed. The computer dock 28', including a CD Rom, a cellular telephone, and a global location device as described above, and has connectors attached to the functions of the computer dock for connecting to the jacks of the computer 100.

Figure 21:
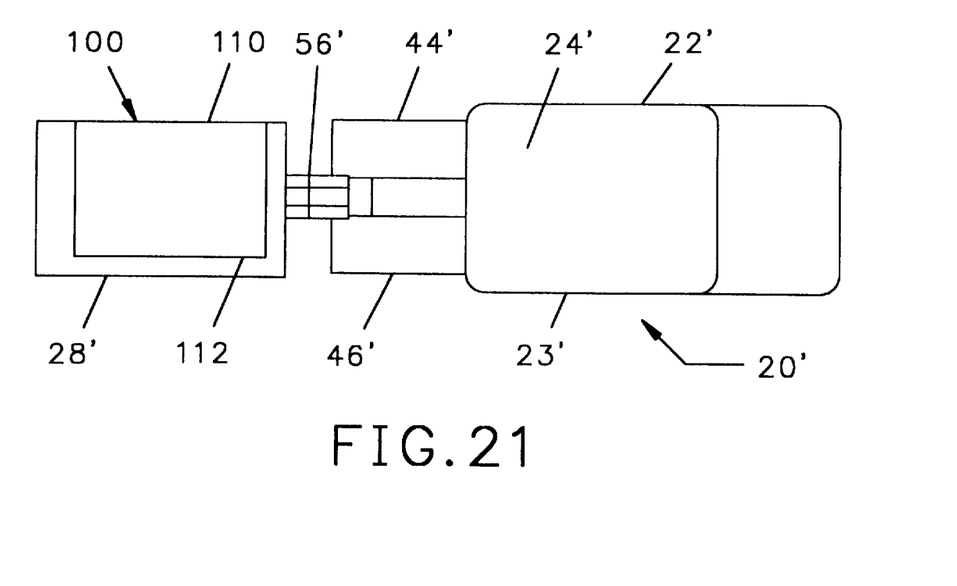
FIG. 21 is another top elevational view of the armrest, dock, and computer shown in FIG. 18 with the computer and dock rotated prior to being moved within the enclosure of the armrest.
Figure 22:
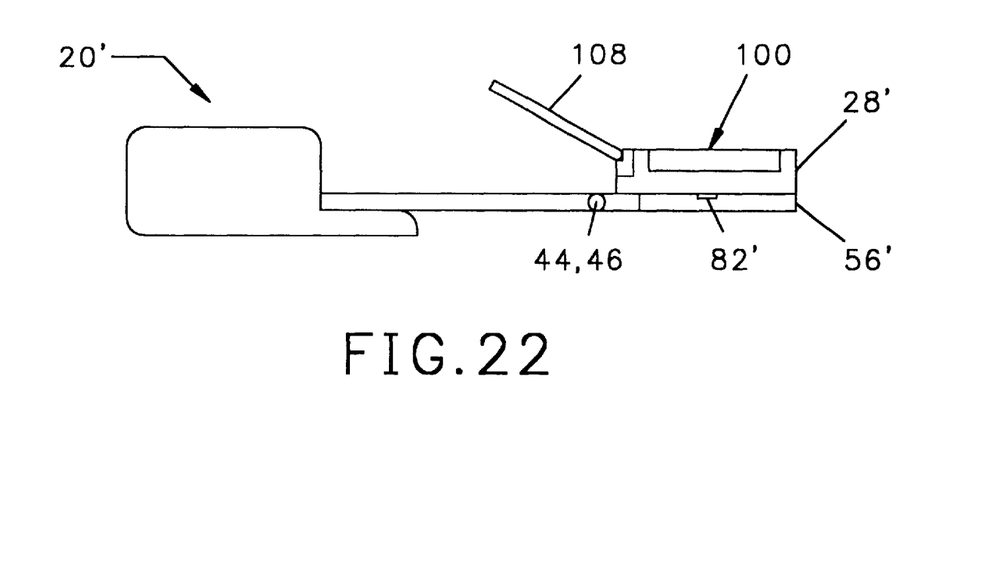
FIG. 22 is a side elevational view of the armrest, dock, and computer shown in FIG. 18 with the tray and computer moved to the rearward of the armrest for use by passengers in the rear seat.
Figure 23:
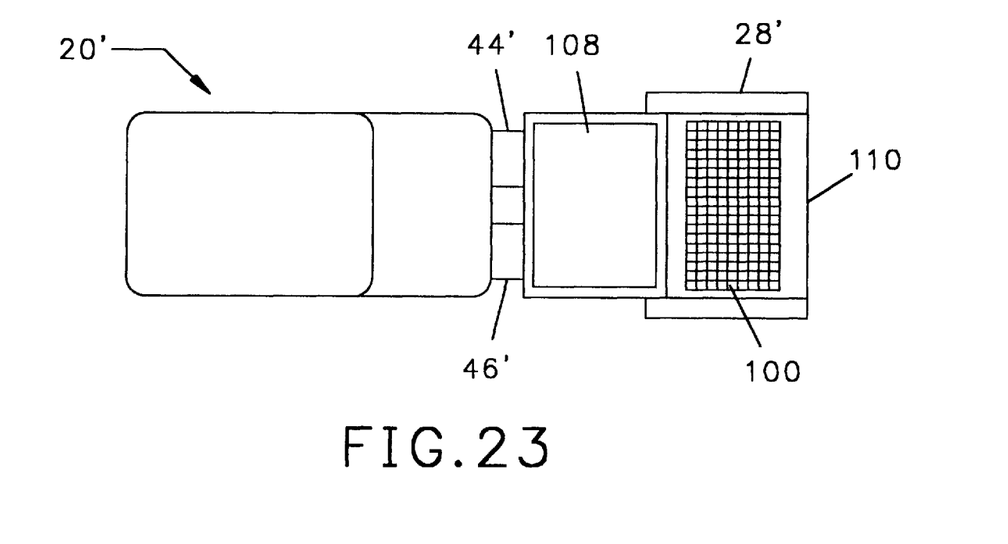
FIG. 23 is a top elevational view of the armrest, dock, and computer as shown in FIG. 22.

The computer 100 has a computer body on the upper surface of which is a keyboard 104, and pivotally attached to one of the long sides of the computer 100 is a panel, the inner surface of which has a screen 108. When the computer 100 is in use, the screen 108 is folded away from the computer body 100 as shown in FIGS. 18, 19, 20, 22 and 23 and, when not in use, the panel bearing the screen 108 is folded against the body 100 as shown in FIG. 21. Before storing the computer 100 in the armrest 20', the dock 28' is rotated about the turntable 82' until the long sides 110, 112 of the computer 100 are longitudinally aligned to fit between the sides 22' 23' of the armrest 20 as shown in FIG. 21. Thereafter, the dock 28' with the computer 100 thereon can be moved into the enclosure defined by the sides 22' 23' and the upper surface 24' of the armrest 20'.

While the present invention has been described with respect to two embodiments, it will be appreciated that many modifications and variations may be made without departing from the true spirit and scope of the invention. It is therefore the intent of the appended claims to cover all such modifications and variations which fall within the true spirit and scope of the invention.

What is claimed:

1. A mounting for retaining a computer within a vehicle, said mounting comprising
   an enclosure defining an outer surface of an armrest between two adjacent seats of a vehicle,
   said enclosure having a forward opening, a rearward opening, and a passage extending from said forward opening to said rearward opening,
   a tray for retaining a computer thereon,
   means within said enclosure for moving said tray between a first position wherein said tray is positioned forward of said forward opening, a second position wherein said tray is positioned rearward of said rearward opening, and a third position wherein said tray is positioned within said enclosure, and
   means connectable to said computer for providing support functions to said computer.

2. The mounting of claim 1 wherein said means for providing functions to said computer comprise a power cable.

3. The mounting of claim 1 wherein said means for providing functions to said computer comprise a CD Rom.

4. The mounting of claim 1 wherein said means for providing functions to said computer comprise a global locating device.

5. The mounting of claim 1 wherein said means for providing functions to said computer comprise a cellular telephone.

6. The mounting of claim 1 wherein said means for moving said tray comprise a plurality of guides and at least one member moveable in said guides.

7. The mounting of claim 1 wherein said means for providing functions to said computer comprise a cellular telephone, a modem, a CD Rom, and a global communications devise and all of said components are built into said tray.

8. The mounting of claim 1 and further comprising a pivot for pivoting said tray about a vertical axis.

9. The mounting of claim 1 wherein said means for moving said tray further comprises
   a moveable member, said moveable member linearly moveable in said enclosure, and
   said tray pivotally retained to said moveable member for rotation about an axis perpendicular to said linear movement.

10. The mounting of claim 1 wherein said means for moving said tray comprises
    an elongate member having an end piece slideably retained in said enclosure, said elongate member having a longitudinal axis and an end,
    said tray mounted on said end of said elongate member, and
    said tray rotatably mounted with respect to said elongate member for rotation about said longitudinal axis.

11. The mounting of claim 1 and further comprising
    a first door for closing said forward opening,
    a second door for closing said rearward opening, and
    means for preventing a second of said doors from opening when a first of said doors has been opened.

12. A mounting for retaining a computer in a vehicle comprising
    an enclosure defining an outer surface of an armrest for use between two adjacent seats of said vehicle,
    said enclosure having an opening and an inner cavity,
    a tray for retaining a computer thereon,
    means within said enclosure for moving said tray between a first position wherein said tray is positioned outward of said opening, and a second position wherein said tray is positioned within said cavity,
    said means for moving said tray including a longitudinal guide and a slide moveable along said guide,
    said movement of said slide defining an axis,
    a first pivot on said slide for rotating said tray about an axis parallel to said axis defined by movement of said slide, and
    means connectable to said computer for providing support functions to said computer.

13. A mounting in accordance with claim 12 and further comprising a door for closing said opening.

14. A mounting in accordance with claim 12 and further comprising a second pivot on said slide for rotating said tray about an axis perpendicular to said axis defined by said movement of said slide.

15. The mounting of claim 12 wherein said means for providing functions to said computer comprise a cellular telephone, a modem, a CD Rom, and a global communications devise and all of said components are built into said tray.

* * * * *